May 24, 1955  F. G. BOUCHER  2,709,069
ORIENTING SUBSURFACE EARTH CORES IN SITU
Filed April 28, 1952  5 Sheets-Sheet 2
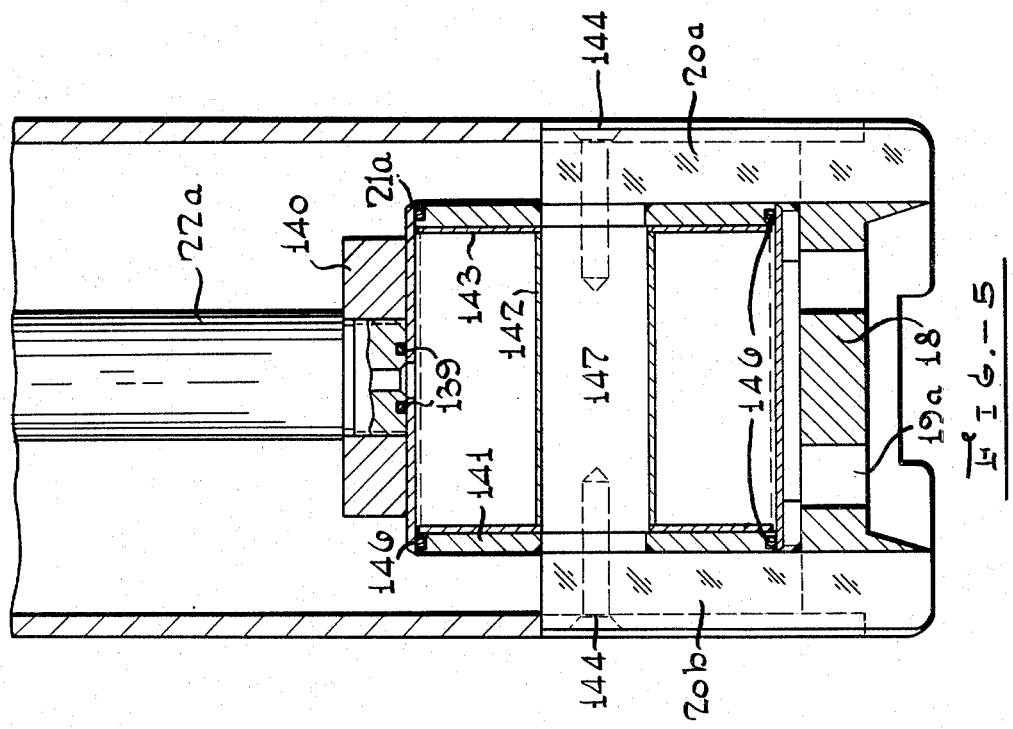
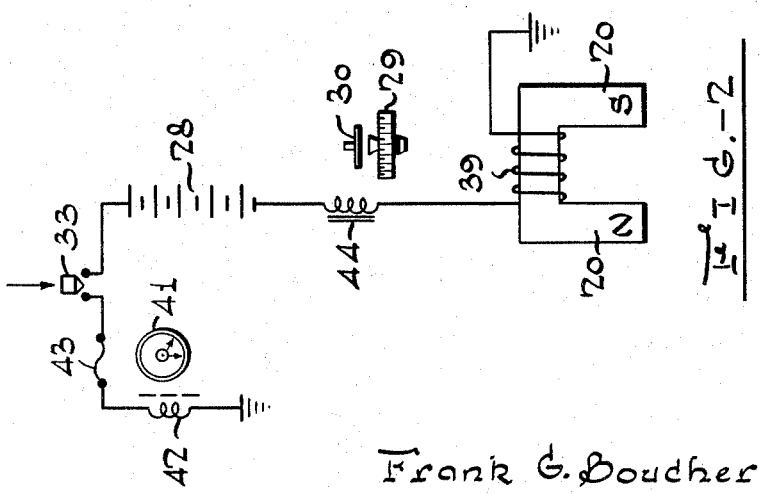
Frank G. Boucher Inventor
By W. O. T Hilman Attorney May 24, 1955 F. G. BOUCHER 2,709,069
ORIENTING SUBSURFACE EARTH CORES IN SITU
Filed April 28, 1952 5 Sheets-Sheet 4

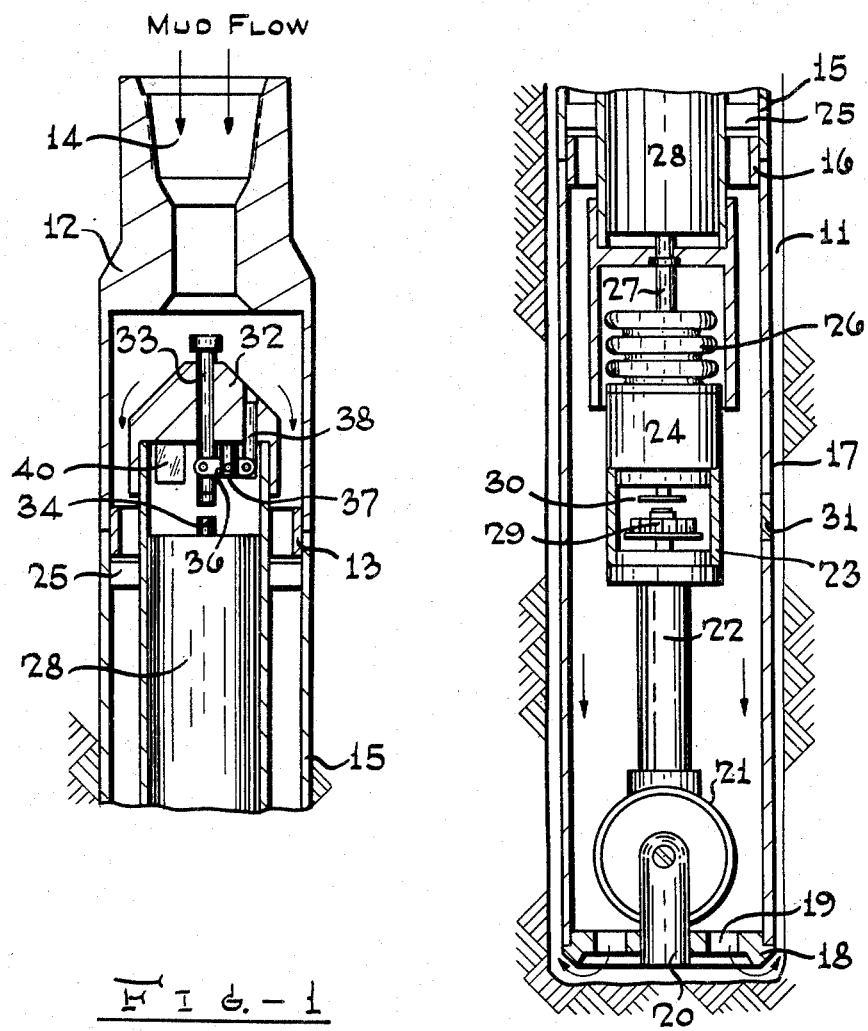

Frank G. Boucher Inventor
By W. O. T Heilman Attorney

May 24, 1955     F. G. BOUCHER     2,709,069
ORIENTING SUBSURFACE EARTH CORES IN SITU
Filed April 28, 1952     5 Sheets-Sheet 5
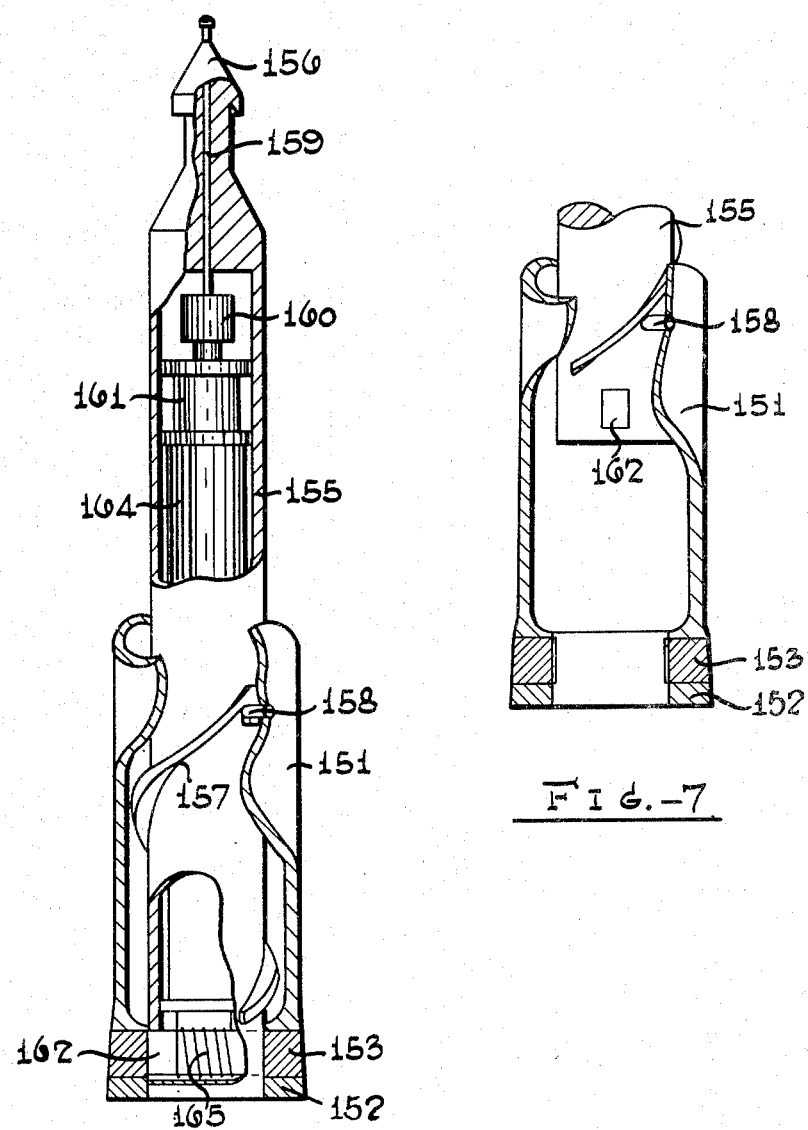
Frank G. Boucher Inventor
By W. O. T. Heilman Attorney

United States Patent Office 2,709,069
Patented May 24, 1955

2,709,069

ORIENTING SUBSURFACE EARTH CORES IN SITU

Frank G. Boucher, Tulsa, Okla., assignor to Esso Research and Engineering Company, a corporation of Delaware Application April 28, 1952, Serial No. 284,787

15 Claims. (Cl. 255—1.4)

This invention concerns a method and apparatus for orienting core samples taken from subsurface strata that are encountered in the drilling of bore holes in the earth, as for example, in the drilling of oil wells.

Core orientation involves removing from a bore hole a sample cut by an oil well coring bit and orienting it in space in the same position that it occupied in the formation from which it was taken. Normally such orientation of core samples is done for the purpose of aiding in the proper evaluation of subsurface geology and thus determining the proper drilling program for the well. A further purpose is to facilitate the proper development of an oil field by ascertaining the dip and strike of subsurface formations, such data being of considerable importance to the geologist. This information can be obtained from any oriented core that contains bedding planes.

Although data for determining dip and strike can be obtained by other methods, as for example by electric logging and bore hole profile logging techniques, such methods rely on the difference in properties between the successive strata and are not applicable where massive bodies of limestone or sandstone are encountered. Hence the need for orienting cores to obtain the fullest information when boring a well.

In some instances it is possible to orient a core by its inherent natural magnetism which may have been established by the orienting effect of the earth's magnetic field during the time the particular formation was laid down or which may be the later result of the magnetizing influence of the earth's magnetic field acting upon the magnetizable particles present within the formation over long geologic periods of time. However, such methods of orienting cores are not often feasible and when feasible are not always reliable. Thus it is usually necessary to orient the cores by some method of marking during or prior to the taking of the core. Previous methods of orienting cores have involved marking the top of the core in some manner, as for example, by stamping an oriented arrow on the top of the subsurface layer that is to be cored or by attaching a layer of cement or other hardenable material containing magnetic particles to the top of the subsurface layer to be cored. Another method is to drill a pilot hole into the subsurface layer and fill the hole with a hardenable material containing magnetic particles. Each of these methods has not been entirely satisfactory however because of the tendency for the oriented portion of the core to break off in raising the core to the surface.

It is an object of the present invention to provide a method and apparatus whereby the rock in place is positively oriented so that a core subsequently taken from the rock can be oriented regardless of any breaking of the core in handling. It is a further object of the invention to provide a method and apparatus whereby the rock in place is subjected to a strong magnetic field of known orientation before the core is taken so that after cutting, the original orientation of the core may be ascertained by making use of the remanent induced magnetism.

The nature and objects of the invention will be more fully appreciated from the ensuing description and from the accompanying drawings in which:

Figure 1 and Figure 1a together comprise an elevational section showing a general view of one embodiment of the invention in position at the bottom of a bore hole, Figure 1a being a lower continuation of Figure 1;

Figure 2 is a circuit diagram for the apparatus of Figure 1;

Figure 5 is a cross-section elevational detail of a magnetizing head assembly;

Figure 6 is a schematic elevational view of an embodiment of the invention utilizing a retrievable magnetizing element in conjunction with a non-magnetic diamond head core barrel; and Fig. 7 is a schematic view of a portion of the apparatus of Fig. 6 showing the co-action of a portion of the magnetizing element and the core barrel as the element is lowered into the barrel.

Figure 3:
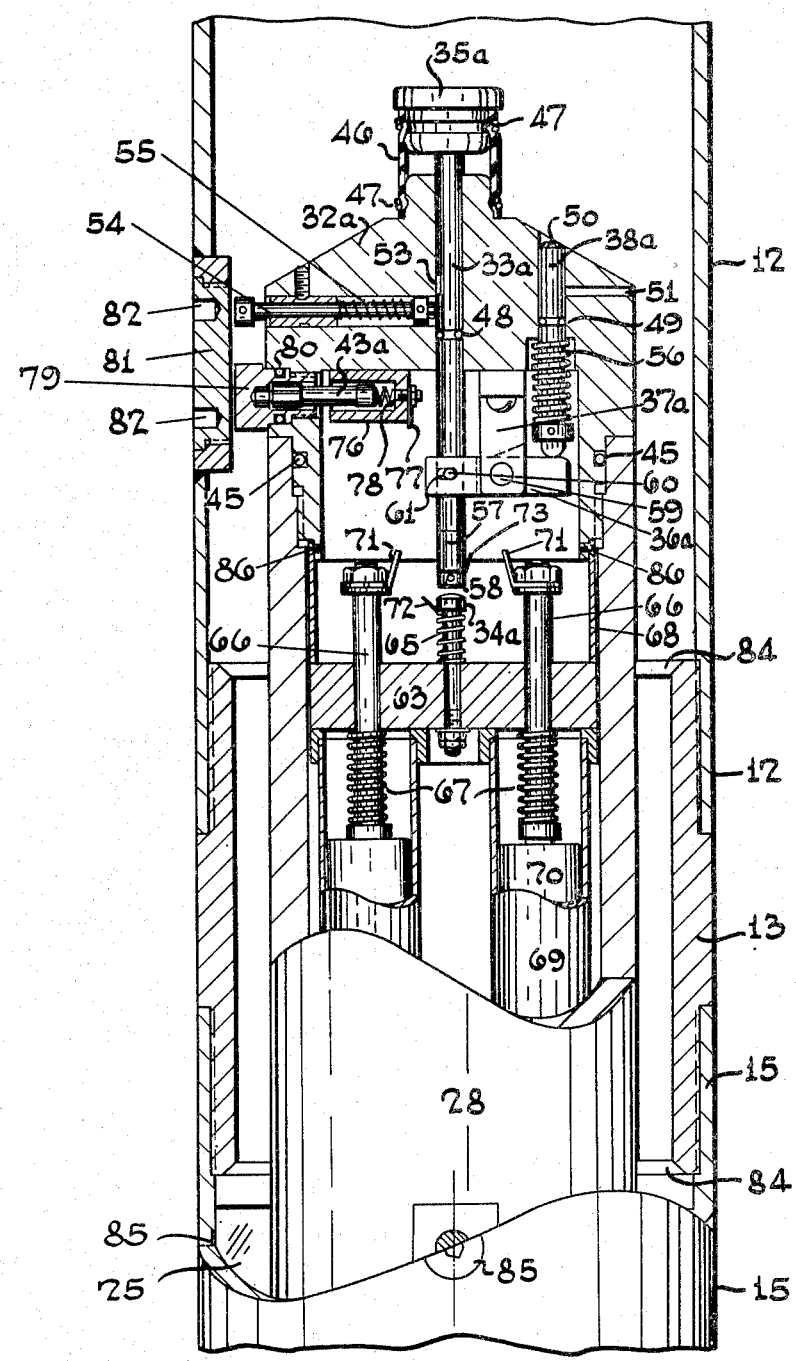
Figure 3 is a cross-section elevational detail of the upper portion of the battery case and switch assembly of an embodiment similar to that of Figure 1.

Referring now to Figures 1 and 1a, which together present an elevational view of one form of apparatus in position in a bore hole 11, it will be seen that a housing is provided having an upper portion 12 in the form of a tool joint section that is attachable to the lower end of a drill pipe and is provided with a central passageway 14 through which fluids may flow from the drill pipe. A separable intermediate portion of the housing 15 and a lower housing portion 17 complete the housing assembly, the sections being held together by couplings 13 and 16. The lower portion 17 is preferably constructed of non-magnetic material as will be more fully explained below. Fixed to the lower end of the housing is a guard plate 18 having one or more fluid openings 19 so that drilling mud or other fluid may pass from the drill pipe through the housing and back up the annulus in the bore hole to clear the bottom of the hole of debris, so that the magnetizing head may be set on bottom.

Fastened in the lower portion of the housing are a pair of magnetic pole pieces 20 placed on each side of a coil case 21 containing a coil to energize the pole pieces. Positioned at an appreciable distance above the coil case is a compass case 23 superimposed by a relay case 24 to the top end of which is attached a bellows 26. The coil case and the compass case are connected by a long spacer cylinder 22 having a central bore so that fluid communication is established between the coil case and the compass case, these cases being filled with oil so as to prevent their collapse under high pressures existing at the bottom of the well bore. The purpose of the bellows 26 is to provide for expansion and contraction of the oil volume with changes in temperature as will be more fully explained in connection with Figure 4.

In the intermediate portion 15 of the housing a battery case 28 is positioned to hold a number of dry cells for energizing the coil in the magnetizing head, a tubular connector housing 27 connecting the battery case with relay case 24. Positioned in the upper portion 12 of the housing is a switch assembly held by cap 32 on top of the battery case. The switch assembly consists of a switch shaft 33 which is adapted to move downward to contact post 34. The shaft 33 is pivotally attached to a rocker arm 36 which in turn is pivotally held by a pivot block 37 attached to cap 32. The opposite end of the rocker arm moves a pressure equalizing shaft 38. The function of the equalizing shaft will be more fully understood from the description of Figure 3. A watch case 40 may be attached to cap 32 to hold a clock or watch which may be stopped when the circuit is closed to serve as a check on the proper operation of the instrument.

The general operation of the device may now be understood from the foregoing description of Figures 1 and 1a when considered in conjunction with the circuit diagram of Figure 2. When it is desired to magnetize the formation at the bottom of the bore hole the device is run into the bore hole on the end of a drill string while drilling mud is circulated through the drill string in the usual manner. As the bottom of the bore hole is approached the stream of drilling mud will sweep away debris below the device and thus ensure positive contact with the bottom of the bore hole. Then a go-devil is dropped down the drill string and enters chamber 14 where it will strike the head of switch shaft 33 so that the latter will make positive contact with contacting post 34 and complete the electrical circuit. This will cause current to flow through coil 39 and energize the magnetic pole pieces 20, creating a magnetic field in the formation at the bottom of the bore hole. At the same time that the circuit is closed solenoid 44 will be energized, which will cause compass clamp 30 to clamp compass 29 so that orientation of a selected point on the instrument at the time the formation is magnetized can later be ascertained. It will be seen that solenoid 42 will likewise be energized at the same time to stop the operation of watch or clock 41 so that the time at which the circuit was closed can also be later ascertained. By knowing the time at the surface at which it was known that the device should have been on bottom it can be determined whether or not the circuit was closed prematurely. After current has flowed through coil 39 for a predetermined period of time, fuse 43 will melt and open the circuit, thus preventing complete discharge of the cells in battery case 28. This enables the cells to be used several times before they must be replaced.

After the cores have been taken from the magnetized formation it is a relatively simple matter to determine their magnetic orientation. For example this may be done with a magnetometer of the type described by Johnson, Murphy and Michelsen in "Review of Scientific Instruments," vol. 20, page 429 (June 1949). With such an apparatus the core is rotated adjacent a pickup coil at a predetermined rate and measurement is made of the phase of the induced alternating voltage as referred to the alternating voltage from a reference generator rotated by the same shaft that rotates the core, the measured phase difference giving by simple geometry the direction of magnetization of the core. The core can then be marked as to its north-south induced magnetism, and by knowing the alignment of pole pieces 20 with respect to magnetic north at the time the formation was magnetized, by inspection of the clamped compass, the core can be marked as to true north with respect to the earth's magnetic field.

The operation of the switch assembly of the magnetizing apparatus can be more fully understood from Figure 3 which shows in cross-section elevational detail the upper portion of the battery case and switch assembly of an embodiment similar to that of Figures 1 and 1a. It will be seen that switch shaft 33a fits slidably in an opening in the center of battery case cap 32a and has a pivot pin 60 that engages an elongated slot 61 in rocker arm 36a which is pivotally supported on pivot block 37a by pivot pin 59. Thus when switch shaft 33a is moved downward, rocker arm 36a will push equalizing shaft 38a upward against spring 56. Shafts 33a and 38a are of the same diameter so that any pressure that would tend to move shaft 33a downward and thus close the switch is opposed by an equal downward force exerted on shaft 38a through port 50. The purpose of spring 56 is to prevent the premature closing of the switch by the action of debris and the like striking shaft head 35a as the device is being lowered into the hole and also to facilitate the resetting of the switch, as will be explained. Ring seals 48 and 49 are set in grooves in each of the shafts to keep drilling mud from entering the switch chamber inside the battery case cap. Additional sealing means are provided by injecting grease through grease port 51 so that it surrounds shaft 38a.

In order that debris will not collect under shaft head 35a and thus prevent the proper functioning of the switch a flexible sleeve 46, preferably made of an oil-resistant synthetic rubber, is placed around the shaft head and the neck of the cap 32a and is held in place by wire rings 47 that press the sleeve into suitable grooves in the shaft head and in the cap, as shown. Once the switch has been closed by the action of a go-devil striking head 35a, switch shaft 33a is held down by the action of catch 54 which is urged into notch 53 on the shaft by means of spring 55.

As shaft 33a is pushed downward, contact point 58 on the lower end of the shaft is brought into contact with contact post 34a which is slidably fitted within terminal plate 63 and can be pushed downward against spring 65, which will urge contacts 58 and 34a against each other when the switch is closed. Contact point 58 is insulated from shaft 33a by a cylindrical insulator 57.

Figure 4:
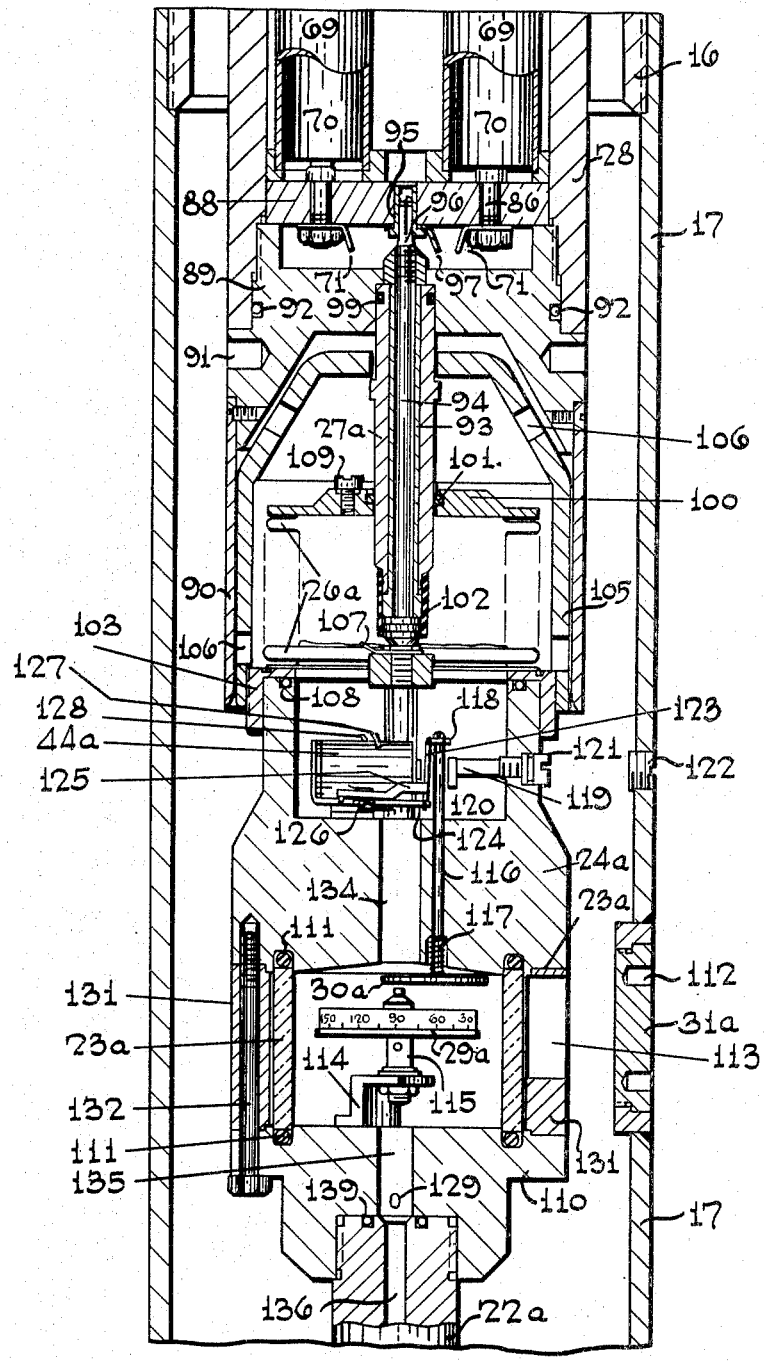
Figure 4 is a cross-section elevational detail of the clamping relay and compass section of an embodiment similar to that of Figure 1.

The battery within battery case 28, which supplies current for the circuit, is made up of a plurality of dry cells 70 that fit within tubes 69, the latter being held in place by an upper terminal plate 63 and a lower terminal plate 88 as shown in Figure 4. Electric contact for the dry cells is established through terminal rods 66 which fit slidably within terminal plate 63 and which are urged against the dry cells by means of springs 67. Terminal plate spacer 68 prevents terminal plate 63 from being moved upward by spring 67. The blocks 25 which position battery case 28 within housing section 15 are held in place by screws 85. Coupling member 13 that detachably connects upper housing section 12 and middle housing section 15 is provided with a beveled edge 84 to facilitate insertion and removal of the battery case 28.

Fuse 43a is held in place by means of a fuse holder 76 attached to the bottom of cap 32a and by fuse holder cap 79 that screws into head 32a and holds the fuse against a spring 78. Thus one of the ground connections for the circuit is established through the outer end of the fuse 43a and the fuse holder cap 79.

For purposes of clarity, conductors connecting the various battery terminals and switch terminals are not shown but it is to be understood that such conductors will be used to connect fuse clip 77 with switch terminal 73 and to connect switch terminal clip 72 with one of the battery terminal clips 71 to complete the circuit as shown in Fig. 2. The remaining battery terminals 71 will be connected with each other to place all of the dry cells in battery case 28 in series or parallel as desired.

An access plug 81 is threadedly attached to a suitable opening in the side of housing section 12 and, by means of a spanner wrench that fits into wrench holes 82, can be removed to provide access for replacing the fuse and for re-setting the switch by pulling out latch 54, whereupon spring 56 will raise shaft 33a.

Reference will now be made to Fig. 4 which shows in cross-section elevational detail the clamping relay section, the compass section and the lower end of the battery section of an embodiment similar to that of Figures 1 and 1a. The lower end of battery case 28 is closed off by an end cap 89 which holds lower terminal plate 88 in place, lower battery terminals 86 fitting into appropriate holes in terminal plate 88. Ring seals 92 are provided to prevent drilling mud from entering the lower end of the battery case. A socket 95 is inserted in the center of lower terminal plate 88 to receive plug 96 on the end of connector 94, the latter fitting into an insulating sleeve 93 in connector housing 27a which is supported by relay case 24a. Ring seal 99 adjacent the top of connector housing 27a also prevents drilling mud from entering battery case 28. A cap 103 on top of relay case 24 supports a protective cover 105 to prevent damage to bellows 26a. Holes 106 are provided in the cover to facilitate removal of mud when disassembling. A guide sleeve 90 is attached to the bottom of battery case end cap 89 to facilitate assembly when directing plug 96 into socket 95.

The top end 100 of bellows 26a fits slidably around connector housing 27a and is provided with a groove carrying a ring seal 101 to prevent escape of oil from the bellows or the entrance of drilling mud into the bellows. A flexible seal 102 similar to the flexible seal 46 prevents oil from leaking into housing 93 around the connector 94. A filler plug 109 is provided in the top of the bellows for the introduction or removal of oil.

Referring now to the compass section, compass housing 23a comprises a transparent cylinder set into grooves in the bottom of relay case 24a and in the top of compass case base 110, the assembly being held together by bolts 132. A spacing cylinder 131 is placed around compass housing 23a to take up the stress from the bolts so that when the bolts are drawn up there will be just sufficient pressure on case 23a to compress ring seals 111 to give an effective seal against loss of oil from the compass case or the entrance of mud from the exterior of the case. A hole 113 is drilled in the side of cylinder 131 to permit viewing of the compass within the case. The compass itself comprises a support bracket 114 mounted on base 110 and supporting a pivot post 115 which in turn pivotally supports the compass 29a.

The clamping mechanism for the compass comprises a clamping pad 30a fastened to a clamping shaft 116 that extends upward into the cavity within relay case 24a. The clamping shaft is held away from the compass against the pressure exerted by spring 117 by means of a latch 123 that is pivotally supported by a latch support bracket 124. When solenoid 44a is energized as described in connection with Fig. 2, latch 123 will be pulled away from shaft lifting pad 118 and rod 116 will move down because of the bias exerted by spring 117, and clamping pad 30a will clamp the compass. When it is desired to release the compass this can be done by turning cam rod 119, using a screw driver to engage screw head 121, which will cause cam 120 to lift shaft lifting pad 118 and raise the shaft 116. When this is done, spring 126 acting against latch lever arm 125 will place latch 123 under the lifting pad 118 and prevent the shaft from moving downward. Thus it is a simple matter to turn screw head 121 through a half turn and back to re-set the clamp. Access to the screw head 121 through housing section 17 is obtained by removing plug 122. Similarly, access to the visible portion of compass case 23a is obtained by removing plug 31a, spanner wrench holes 112 being provided for this purpose.

As in the case of Fig. 3 the conductors connecting the various elements of the electrical circuit have been omitted in order to clarify the illustration. It is to be understood, of course, that suitable conductors will be provided to connect one of the battery clips 71 with socket clip 97, to connect connector clip 107 with solenoid terminal 127, and to connect solenoid terminal 128 with one end of the magnetizer coil at the bottom of the apparatus.

It is preferred that two conductors be used to connect terminal 128 with the magnetizing coil and to run these conductors through parallel holes on opposite sides of relay case 24a so that the conductors will pass the compass on opposite sides, thereby neutralizing any magnetic effects that a single conductor passing the compass would have on the latter. The two conductors then pass through diagonal openings at the bottom of the compass case into passageway 135. The terminus of one diagonal opening is indicated at 129. The two conductors are carried down through passageway 136 to the coil. Passageways 134, 135 and 136 also establish communication between the interiors of the bellows, the relay case, the compass case and the coil case so that this entire system may be filled with oil, as previously described.

Spacer cylinder 22a is threaded into base 110 and extends down to the top of the coil case shown in Figure 5.

Referring now to Figure 5 the bottom of spacing cylinder 22a is attached to a cylindrical block 140 which in turn is fastened to the cylindrical coil case 21a. End plates 141 fit into each end of the case 21a and are spaced the proper distance apart by coil core 147. Ring seals 146 retain the oil within the case and prevent the entrance of drilling mud. An insulating spool comprising cylinder 142 and plates 143 surrounds the core 147 on the interior of the coil case to furnish an insulated form on which the coil may be placed. The coil itself is not shown. The magnetic pole pieces 20a and 20b hold the end plates of the coil case in position when the pole pieces are attached to the core by means of screws 144.

An embodiment of the invention as shown in Figs. 3, 4 and 5 that was built and used had a housing seven inches in diameter, carried a magnetizing coil made of 3100 turns of No. 20 wire and operated from 100 flashlight-type dry cells in series, the circuit being fused for 0.1 second passage of current. This apparatus successfully magnetized a sandstone formation at the bottom of a drilled well to a depth of at least five inches as determined from cores subsequently taken from the formation. Numerous tests showed that the dry cells could be used effectively for at least ten 0.1 second discharges before replacement. Other tests showed that with higher available voltages, i. e. using a larger number of dry cells, sandstones can be similarly magnetized to a depth of 10 to 12 inches, thus ensuring positive orientation of cores subsequently taken even though portions of the cores might be broken off in handling.

The embodiments of the invention thus far described have the disadvantage that they are designed for attaching to the bottom of the drill pipe, which means that each time the bottom of the bore hole is magnetized the drill pipe must be pulled out of the hole to remove the magnetizing apparatus and substitute a core bit to take a core of the magnetized formation. Therefore, an embodiment of the invention wherein a retrievable magnetizing device can be sent down through the drill pipe into a core barrel is preferable in view of the considerable saving in time that would thereby be effected. One such embodiment of the invention is shown schematically in Figures 6 and 7. A special core barrel 151 is employed constructed of non-magnetic material such as non-magnetic stainless steel. The core barrel has a conventional diamond cutting head 152 which is modified by the insertion of diametrically opposed magnetic pole pieces 153, space limitations preventing the incorporation of the pole pieces in the magnetizing unit itself. When it is desired to induce magnetism in the formation below the coring tool a magnetizing instrument 155 is lowered into the core barrel. The magnetizing unit 155 is constructed in the same general manner as the embodiments previously described with the exception that only the core 162 and the coil of the magnetizing head are in the unit. The other elements of the unit include a switch shaft 159, a switch and relay housing 160, a compass case 161, a battery case 164 and a magnetizing coil 165. An elongated spiral 157 is fastened to the outside of the unit and is so designed that it will engage orientation pin 158 fixed to the inside of core barrel 151 so that as the unit is lowered into place in the core barrel the magnetizing core 162 will be aligned with the pole pieces 153 in the core barrel. The action of the spiral can readily be understood by inspection of Fig. 7, the spiral covering a little more than 360° of the circumference of the unit. It will be noted that the upper end of the unit terminates in a spear head 156 so that the unit may be retrieved with an overshot. The overshot may also serve the function of the go-devil to actuate switch shaft 159 in the same manner as the switch shafts previously described.

When it is desired to cut a magnetized core from the formation at the bottom of the bore hole the instrument 155 is lowered or dropped down through the drill pipe, the fall of the instrument being cushioned by the drilling mud. As the instrument enters the core barrel the spiral 157 will engage pin 158 as described. Since the spiral covers slightly more than 360° of the circumference of the instrument the spiral and pin will engage regardless of the initial rotational relation of the core barrel and the magnetizing unit. Thus when the unit has reached bottom it will be rotated by the spiral so that the magnetizing core will be properly lined up with the pole pieces. Circulation of the drilling mud ahead of the magnetizing unit as it is lowered into place serves to wash away debris that may be present in the bottom of the bore hole, thus ensuring proper setting of the unit. A conventional overshot attached to a wire line is then lowered into the drill pipe. When the overshot engages the spearhead 156 it will push shaft 159 downwardly and close the circuit that energizes the magnetizing coil. The formation below the coring bit will then be magnetized by the pole pieces 153. The wire line is then pulled up through the drill pipe, taking with it the magnetizing unit 155. The cutting of a core from the magnetized formation below the coring bit can then proceed in the conventional manner.

It is not intended that this invention be limited to the specific embodiments described, as numerous obvious modifications thereof will occur to persons skilled in the arts pertaining thereto.

For example, in the embodiment shown in Figures 6 and 7 the instrument 155 can be suspended on a conducting cable and the coil energized from the surface, thus eliminating the battery case 164 and the switching device. Practical considerations make it normally preferable to provide electrical storage means within the unit, however, since the use of such a conducting cable would necessitate considerable additional investment and handling expense.

It is intended that the scope of this invention be limited only by the following claims.

What is claimed is:

1. An apparatus for imparting magnetism to a subsurface formation at the bottom of a borehole in the earth comprising a body adapted for lowering into the borehole, a magnetizing head carried on the lower end of said body, said head including an electromagnetic coil, an electrical circuit for supplying current to said coil, a magnetic compass positioned within said body out of the magnetic field of said coil, a clamp supported by said body and engageable with said compass to fix said compass against motion relative to said body, and actuating means operable upon the energizing of said electrical circuit to engage said clamp against said compass whereby the azimuthal orientation of said magnetizing head at the moment current is supplied to said coil may be ascertained.

2. Apparatus according to claim 1 wherein said body is attachable to the lower end of a drill pipe, said body having ports adjacent said magnetizing head and passageways within said body communicating between said ports and said drill pipe whereby fluid circulation may be employed to remove debris from the borehole adjacent the formation preparatory to magnetizing the formation.

3. An apparatus for imparting magnetism to a subsurface formation at the bottom of a borehole in the earth comprising a body adapted for lowering into the borehole, a magnetizing head carried on the lower end of said body, said head including an electromagnetic coil, electrical storage means in said body, a circuit connecting said storage means to said coil, a switch in said circuit, switch operating means in said body to close said circuit, a magnetic compass positioned within said body out of the magnetic field of said coil, a clamp supported by said body and engageable with said compass to fix said compass against motion relative to said body, and actuating means operable upon the energizing of said electrical circuit to engage said clamp against said compass whereby the azimuthal orientation of said magnetizing head at the moment current is supplied to said coil may be ascertained.

4. An apparatus according to claim 3 in which said switch operating means includes an element projecting above the body whereby said switch may be closed by contact of said projection with a body dropped into the borehole.

5. Apparatus according to claim 4 wherein said switch element is a vertical shaft slidably held by said body and including a second vertical shaft of essentially the same diameter as said first shaft slidably held in an opening in the top of said body and a lever connecting said shafts whereby downward fluid pressure on one of said shafts is opposed by an equal downward pressure on the other shaft.

6. An apparatus for imparting magnetism to a subsurface formation at the bottom of a borehole in the earth comprising a body attachable to the lower end of a drill pipe, a pair of magnetic pole pieces supported on the lower end of said body, a coil core joining the pole pieces, a coil supported by the core, a compass case supported in the body out of the magnetic field of the coil, a compass within said compass case, a clamp for said compass adapted to fix said compass against motion relative to said body, electrically operated actuating means for said clamp, an electric battery in said body, a switch in said body accessible from the exterior thereof, and an electrical circuit connecting said switch, said battery, said clamp actuating means and said coil whereby said compass will be clamped when said circuit is closed to energize said coil.

7. Apparatus as defined by claim 6 including a fluid-tight housing within the body surrounding said coil and fluid within said housing whereby to prevent collapse of said housing under fluid pressures existing in the borehole.

8. Apparatus as defined by claim 6 including a removable fuse in said body, said fuse being connected in series in said circuit and adapted to open said circuit at the end of a predetermined time interval after the closing of said switch.

9. Apparatus as defined by claim 6 wherein at least a portion of said compass case is transparent and wherein said body is provided with a removable portion adjacent said compass case to provide visual access to said compass.

10. Apparatus as defined by claim 6 wherein said body is provided with fluid ports adjacent said pole pieces and with a fluid passageway connecting said ports with the drill pipe whereby debris at the bottom of the borehole may be removed by fluid circulation to ensure contact of the pole pieces with the bottom of the borehole.

11. Apparatus as defined by claim 6 wherein said compass clamp comprises a shaft movably supported to engage a portion of said compass, a spring normally biasing said shaft into engagement with said compass portion and a latch holding said shaft in opposition to said bias, said actuating means comprising an electromagnet arranged to pull said latch out of engagement with said shaft.

12. An apparatus for imparting magnetism to a formation at the bottom of a borehole from which a core is to be taken, comprising a nonmagnetic core drill attachable to a drill pipe, said drill including a coring head and a core barrel, a retrievable body adapted for lowering through said drill pipe and said core barrel to said coring head, magnet pole pieces inserted in said coring head, a magnetizing head in the lower end of said body, said head including a magnetic core and a coil surrounding said core, aligning means in said core barrel, cooperating aligning means on said body whereby to align said core with said pole pieces, and an electrical circuit for supplying current to said coil.

13. Apparatus as defined by claim 12 including a compass positioned within said body out of the magnetic field of said coil, a clamp for said compass, and clamp actuating means operable by said electrical circuit.

14. Apparatus as defined by claim 12 including electrical storage means in said body connected to said circuit, a switch in said circuit and switch operating means in said body to close said circuit.

15. Apparatus as defined by claim 12 wherein said cooperating aligning means in said core barrel and on said body comprises a projecting pin on one of said last named elements and a cooperating spiral member on the other of said elements whereby said spiral will engage said pin as said barrel slidably receives said body to rotate said body to a predetermined position.

References Cited in the file of this patent

UNITED STATES PATENTS

| | | |
|---|---|---|
| 2,126,775 | Hodgson | Aug. 16, 1938 |
| 2,184,199 | Stephan | Dec. 19, 1939 |
| 2,259,904 | McNanee | Oct. 21, 1941 |
| 2,401,280 | Walstrom | May 28, 1946 |